United States Patent [19]

Brealey

[11] 4,104,497
[45] Aug. 1, 1978

[54] DISCONNECT CONTACT ASSEMBLY FOR METAL-CLAD SWITCHGEAR AND THE LIKE

[75] Inventor: Robert Harwood Brealey, Exton, Pa.
[73] Assignee: General Electric Company, Philadelphia, Pa.
[21] Appl. No.: 719,044
[22] Filed: Aug. 30, 1976
[51] Int. Cl.² .............................................. H01H 9/02
[52] U.S. Cl. ................................... 200/305; 174/142; 174/DIG. 11; 200/144 C
[58] Field of Search ................. 174/142 R, 73 R, 127, 174/DIG. 11; 200/50 R, 144 R, 144 A, 144 B, 144 C, 161, 162, 163

[56] References Cited

U.S. PATENT DOCUMENTS

| | | | |
|---|---|---|---|
| 2,082,055 | 6/1937 | Higgins | 174/142 |
| 3,210,460 | 10/1965 | Park | 174/142 |
| 3,210,460 | 10/1965 | Suelmann | 174/73 |
| 3,210,461 | 10/1965 | Berg et al. | 174/127 |
| 3,397,293 | 8/1968 | Darrow et al. | 200/50 |
| 3,398,348 | 8/1966 | Kilgore | 336/70 |
| 3,646,251 | 8/1968 | Friedrich | |

FOREIGN PATENT DOCUMENTS

| | | | |
|---|---|---|---|
| 897,128 | 5/1945 | France | 174/142 |
| 6,503,344 | 9/1965 | Netherlands | 174/142 |

*Primary Examiner*—Harold Tudor
*Attorney, Agent, or Firm*—William Freedman

[57] ABSTRACT

This disconnect contact assembly comprises a tubular insulator projecting forwardly through a grounded metal plate and surrounding the usual bridging contact subassembly. A current transformer secondary assembly surrounds the tubular insulator. Two separate metallic coatings are provided on the tubular insulator, the first one on the outer peripheral surface of the insulator and the second one on the inner peripheral surface of the insulator. The first metallic coating is normally at ground potential and the second one is normally at the potential of said bridging contact subassembly. In addition, two semiconductor coatings, each having non-linear resistivity properties, are provided on the tubular insulator. The first semiconductor coating is disposed on the external surface of the tubular insulator at the forward end of said first metallic coating. The second semiconductor coating is disposed on the internal surface of the tubular insulator at the forward end of said second metallic coating.

The two metallic coatings act to confine the electric stress in the region of the current transformer secondary and the bridging contact subassembly to the solid dielectric material of the tubular insulator, and the two semiconductor coatings act to grade the electric stresses at the forward ends of the metallic coatings where the equipotential lines of the electric field emerge from said dielectric material.

4 Claims, 3 Drawing Figures

DISCONNECT CONTACT ASSEMBLY FOR METAL-CLAD SWITCHGEAR AND THE LIKE

This invention relates to a disconnect contact assembly for metal-clad switchgear and the like and, more particularly, relates to a contact assembly of this type which has improved ability to withstand high voltages without producing objectionable corona.

The general type of disconnect contact assembly that I am concerned with is shown in U.S. Pat. Nos. 3,397,293—Darrow et al. (FIG. 8) and 3,461,348—Eichelberger, both assigned to the assignee of the present invention. A disconnect contact assembly of this general type comprises a grounded metal plate having an opening therein, a first conductive stud extending through this opening, and a tubular insulator fixed to the first stud and interposed between the stud and the periphery of the opening. A second conductive stud generally aligns with the first stud, and the ends of the two studs are electrically interconnected by a bridging contact subassembly, which is located within the tubular insulator. An annular current transformer secondary assembly surrounds the tubular insulator in the region of the contact subassembly.

When such a disconnect contact assembly is used for high voltages, high electrical stresses tend to develop near the bridging contact subassembly and the current transformer assembly; and such stresses tend to produce corona and resultant dielectric breakdown. This problem is accentuated in a high current design where the studs and the bridging contact subassembly must be larger in order to carry the higher currents, thus decreasing the available electrical clearances. It is possible to reduce the electrical stresses by increasing the size of the tubular insulator and the surrounding current transformer secondary assembly, but this solution is often not a very practical one because the available space is usually limited and because increased size usually results in increased cost.

SUMMARY

Accordingly, an object of my invention is to provide a disconnect contact assembly which can be exceptionally compact despite high current and voltage ratings and yet has a high resistance to corona formation.

In carrying out the invention in one form, I provide two separate metallic coatings on that portion of the above-described tubular insulator that surrounds the bridging contact subassembly. The first metallic coating, which is at ground potential, is interposed between the tubular insulator and the current transformer secondary assembly and coats the outer periphery of the tubular insulator. The second metallic coating, which is normally at the potential of the first stud, coats the inner periphery of the tubular insulator and surrounds the bridging contact subassembly in radially-spaced relationship thereto. In addition, two semiconductor coatings, each having non-linear resistivity properties, are provided on the tubular insulator. The first semiconductor coating is disposed on the external surface of the tubular insulator at the forward end of said first metallic coating. The second semiconductor coating is disposed on the internal surface of the tubular insulator at the forward end of said second metallic coating.

DETAILED DESCRIPTION OF PREFERRED EMBODIMENT

Figure 1:
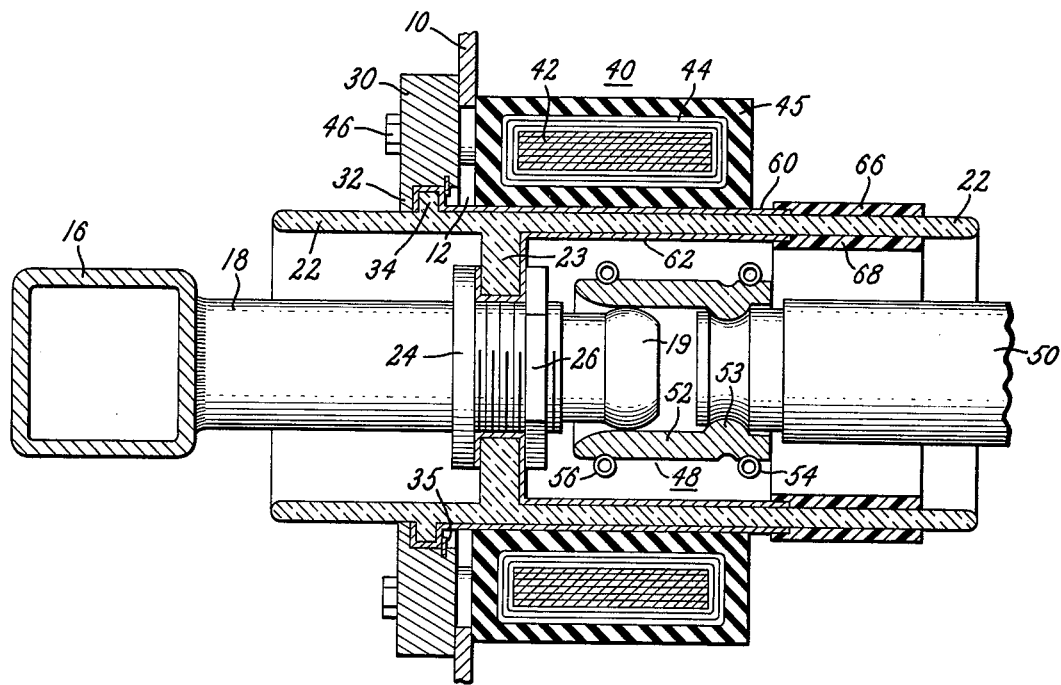
FIG. 1 is a cross-sectional view through a disconnect contact assembly embodying one form of my invention.

Referring now to FIG. 1, the illustrated disconnect contact assembly comprises a stationary metal plate 10 at ground potential having a relatively large opening 12 extending therethrough. Behind the metal plate 10 is a bus bar 16 having a conductive stud 18 projecting horizontally therefrom in a forward direction through the opening 12. The free end 19 of stud 18 is located at the right hand side of metal plate 10.

Interposed between conductive stud 18 and the periphery of opening 12 is a tubular insulator 22 preferably of porcelain, having a radially-inwardly projecting flange 23. This tubular insulator 22 surrounds the stud 18 and is fixed thereto by two annular metal abutments 24 and 26 on stud 18. Abutment 24 is fixed to the stud and abutment 26 is threaded on the stud. When abutment 26 is rotated on the threads to move toward abutment 24, the flange 23 is clamped between the abutments.

The tubular porcelain insulator 22 is supported on metal plate 10 by an adapter 30 of metal that surrounds insulator 22 and is secured thereto at the outer periphery of the insulator. Adapter 30 is shown with an internal shoulder 32 against which an external shoulder 34 on insulator 22 abuts. A suitable retainer, shown as a snap ring 35, holds these two shoulders 32 and 34 together. Adapter 30 is suitably bolted to metal plate 10 in a manner soon to be described.

Surrounding tubular insulator 22 is the annular secondary assembly 40 of a current transformer. This secondary assembly 40 is of a conventional design and, as such, comprises an iron core 42, a secondary winding 44 of insulation-covered wire suitably linked with the core, and a jacket 45 of solid insulating material surrounding the winding and core.

The jacket 45 includes at its outer surface radially-outwardly projecting lugs (not shown). Bolts 46 extend between these lugs and adapter 30, and when tightened, they clamp metal plate 10 between adapter 30 and current transformer secondary assembly 40, thus fixing the secondary assembly 40 and tubular insulator 22 to stationary metal plate 10. The details of this fastening means are not a part of my invention and can take the conventional form shown in the aforesaid Eichelberger or Darrow et al. patents.

Cooperating with stationary contact 18, 19 of the disconnect contact assembly is a contact subassembly 48 mounted on a conductive stud 50 that is generally aligned with the first conductive stud 18. The contact subassembly 48 comprises a plurality of finger contacts 52 disposed in a tubular array and having rounded inwardly-extending projections 53 fitting in a retaining groove in stud 50. A first garter spring biases the projections 53 into the groove. A second garter spring 56 biases the fingers 52 into engagement with the free end 19 of the stationary stud when the parts are in the position of FIG. 1. The contact fingers 52 act as bridging contacts between the studs 18 and 50 when the parts are in the position of FIG. 1.

Figure 2:
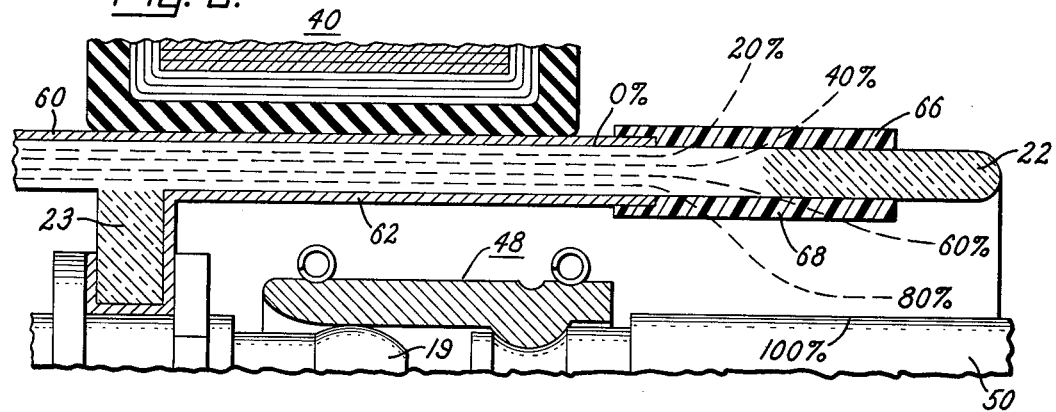
FIG. 2 is a view similar to that of FIG. 1 and illustrating the approximate configuration of the electric field present when the assembly is energized.

When the apparatus of FIG. 1 is energized, studs 18, 50 and the contact subassembly 48 are at a relatively high potential, equal to line voltage, and the current transformer secondary assembly 40 is basically at ground potential. For shaping and distributing the electric field resulting from this potential difference, I provide a first metallic coating 60 at ground potential on the external cylindrical surface of the tubular insulator 22 and a second metallic coating 62 at line potential on the internal tubular surface of insulator 22. In the illustrated embodiment, the external metallic coating 60 is shown connected to ground through contact with the metal adapter 30, which is clamped to the grounded metal plate 10. The internal metal coating 62 is shown electrically connected to stud 18 through contact with metal abutments 24 and 26 on the stud. The internal coating 62 forces line potential to be present along the internal surface of tubular insulator 22, and the external coating 60 forces ground potential to be present along the external surface of insulator 22. Thus, the two coatings cooperate with each other to force the electric field in the region of subassemblies 40 and 48 to be confined to the solid dielectric of tubular insulator 22 which is located between the two coatings 60 and 62. FIG. 2 illustrates this relationship by showing the equipotential lines of the electric field in this region confined to the solid dielectric material of insulator 22.

As shown in FIG. 2, these equipotential lines of the field emerge from the solid dielectric material and enter the surrounding air adjacent the forward ends of the metal coating 60 and 62. For distributing the equipotential lines in this region where they emerge from the solid dielectric material, two voltage-grading coatings 66 and 68 of semiconductor material are provided on the external and internal surfaces, respectively, of the tubular insulator 22.

These voltage-grading coatings have non-linear resistivity properties and, more specifically, a resistivity in any given region that varies inversely with respect to applied voltage. Thus, in regions of high-intensity electric field, the resistivity of the voltage-grading coating is low, and in regions of low-intensity electrical field, its resistivity is high. In the illustrated apparatus, the regions adjacent the end of metal coating 60 and 62 are regions of high intensity electric field where the coating resistivity is relatively low, and the regions adjacent the free ends of the voltage grading coatings 66 and 68 are regions of low intensity field where the resistivity is relatively high. There is a gradual transition in the resistivity of the material between these two extreme regions.

The coatings 66 and 68 are preferably made of a suitable thermosetting resin mixed while in the liquid state with finely-divided particles of silicon carbide. By way of example, and not limitation, suitable resins are epoxies, epoxy-modified urea or melamine formaldehydes, phenolic-modified alkyds, and blends of polyvinylformal and phenolformaldehyde. The silicon carbide is preferably a high-resistivity silicon carbide of the N-type, such as that used in electronic semiconductor devices. The percentage of silicon carbide present will depend upon the desired resistivity range of the coating. In one specific example, the high resistivity silicon carbide is present in an amount of about 25% by volume of the coating composition. More detailed examples of such materials are disclosed in U.S. Pat. 3,210,460—Suelmann.

Other materials suitable for the semiconductor coatings are the silicon carbide-containing glazes disclosed in and applied as claimed in application Ser. No. 628,033—Zlupko, filed Nov. 3, 1975, and assigned to the assignee of the present invention. When such materials are used, the glaze-forming material is applied to the insulator and fired in place thereon, and thereafter the metallic coatings 60 and 62 are applied.

With these coatings 60, 62, 66 and 68 present, the equipotential lines of the electric field are prevented from concentrating in the air space adjacent either the current transformer secondary 40 or the bridging contact subassembly 48. The metal coatings 60, 62 serve to force the equipotential lines away from the right-hand ends of the current transformer secondary 40 and the disconnect contact subassembly 48, preventing them from crowding around parts 40 and 48 in these areas and the non-linear semiconductor coatings 66 and 68 serve to prevent the equipotential lines, as they emerge from the solid dielectric material, from crowding around the right hand, or forward, ends of the metal coatings.

In a preferred form of my invention, as shown in FIG. 2, the inner metallic coating 62 extends in a forward direction (i.e., to the right) slightly beyond the forwardly-located (or right-hand) end of the bridging contact subassembly 48 so as to provide the desired electrical stress-relief adjacent this forwardly-located end. Similarly, the outer metallic coating extends to the right slightly beyond the right-hand end of the current-transformer secondary assembly 40.

Although I prefer to make the coatings 66 and 68 as two discrete coatings separated by uncoated porcelain at the forward end of the tubular insulator 22, it is within my invention in its broader aspects to extend the coatings around the forward end of the tubular insulator so that they, in effect, form a single coating.

Figure 3:
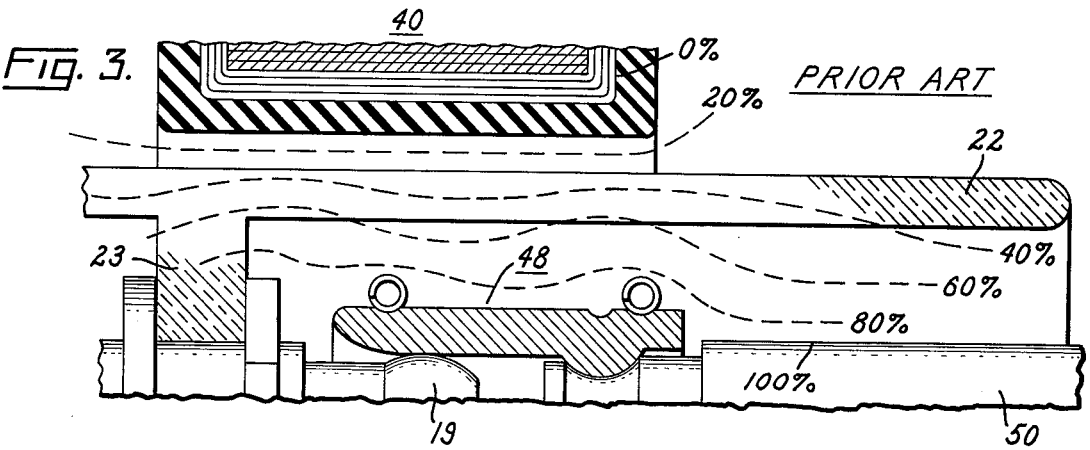
FIG. 3 is a sectional view similar to that of FIG. 2 but illustrating a prior art disconnect contact assembly and the approximate configuration of the electrical field present therein when this assembly is energized.

The manner in which the coatings shape and distribute the electric field can be more clearly understood by comparing FIG. 2 to FIG. 3. FIG. 3 shows as assembly corresponding to that of FIG. 2 except without the coatings 60, 62 and 66, 68 and with a small clearance space between the inner periphery of the current transformer secondary assembly and the tubular insulator 22. It will be noted that in FIG. 3 the equipotential lines of the electric field in the region of the current transformer assembly 40 and the contact subassembly 48 are not confined to the solid dielectric of insulator 22, as is the case in FIG. 2. It will also be noted that the 80% equipotential line is located closely adjacent the contact subassembly 48 and crowds in closely around the right-hand end of this subasemnbly, producing a region of high electric stress concentration at this end. Similarly the 20% equipotential line crowds in closely around the inner right hand edge of the current transformer assembly 40, producing a region of high electric stress at this edge. It will be appreciated that the coatings of FIG. 2 greatly reduce the stresses in these crucial regions, thus enabling the assembly to withstand higher voltage without the formation of objectionable corona.

It is to be understood that the illustrated electric field configurations are intended to be approximate only. They are shown primarily to illustrate the general concept of the invention rather than the precise configuration of the fields.

Although FIGS. 1 and 2 show no air gap between the outer periphery of metal coating 60 and the inner periphery of insulating jacket 45 of the current transformer secondary, it is to be understood that such an air gap can be present, if desired. The coatings 60 and 66 of FIGS. 1 and 2 will remove any significant electric stress from such an air gap. The presence of such an air gap will not significantly affect the configuration of the equipotential lines, as compared to the configuration present without the air gap.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A disconnect contact assembly for metal clad switchgear and the like, comprising:
    a. a metal plate at ground potential having an opening therein,
    b. a first conductive stud extending forwardly through said opening in radially-spaced relationship to the periphery of said opening and terminating in a free end,
    c. a tubular insulator surrounding and fixed to said first stud and also extending through said opening, said tubular insulator having a forward tubular portion that surrounds and is radially spaced from said free end of said first stud,
    d. a second conductive stud generally aligned with said first stud and having an end portion surrounded in radially-spaced relationship by said forward portion of said tubular insulator,
    e. a bridging contact subassembly bridging the ends of said studs and conductively interconnecting said ends, said bridging contact subassembly being located in a position surrounded by said forward portion of said tubular insulator and radially spaced from said forward portion of said tubular insulator,
    f. an annular current transformer secondary assembly surrounding said portion of said tubular insulator,
    g. a first metallic coating normally at ground potential surrounding said portion of said tubular insulator and said secondary assembly, and coating the outer periphery of said portion of said tubular insulator,
    h. a second metallic coating normally at the potential of said first stud coating the inner periphery of said forward portion of said tubular insulator and surrounding said bridging contact subassembly in radially-spaced relationship thereto,
    i. a first semiconductor coating having non-linear resistivity properties on the external surface of said tubular insulator at the forward end of said first metallic coating, and
    j. a second semiconductor coating having non-linear resistivity properties on the internal surface of said tubular insulator at the forward end of said second metallic coating.

2. The disconnect contact assembly of claim 1 in which said two metallic coatings act to confine the electrical stress in the region of said current transformer secondary assembly and said bridging contact subassembly to the solid dielectric material of said tubular insulator, and said semiconductor coatings act to grade the electric stresses at the forward ends of the metallic coatings where the equipotential lines of the electric field emerge from said dielectric material.

3. The disconnect contact assembly of claim 1 in which said second metallic coating extends forwardly of said tubular insulator slightly beyond the forwardly-located end of said bridging contact subassembly.

4. The disconnect contact assembly of claim 3 in which said first metallic coating extends forwardly of said current transformer secondary assembly slightly beyond the forwardly-located end of said secondary assembly.

* * * * *